Aug. 9, 1938.   P. T. GRIFFIN   2,126,631
DRAIN PAN
Filed Jan. 11, 1937
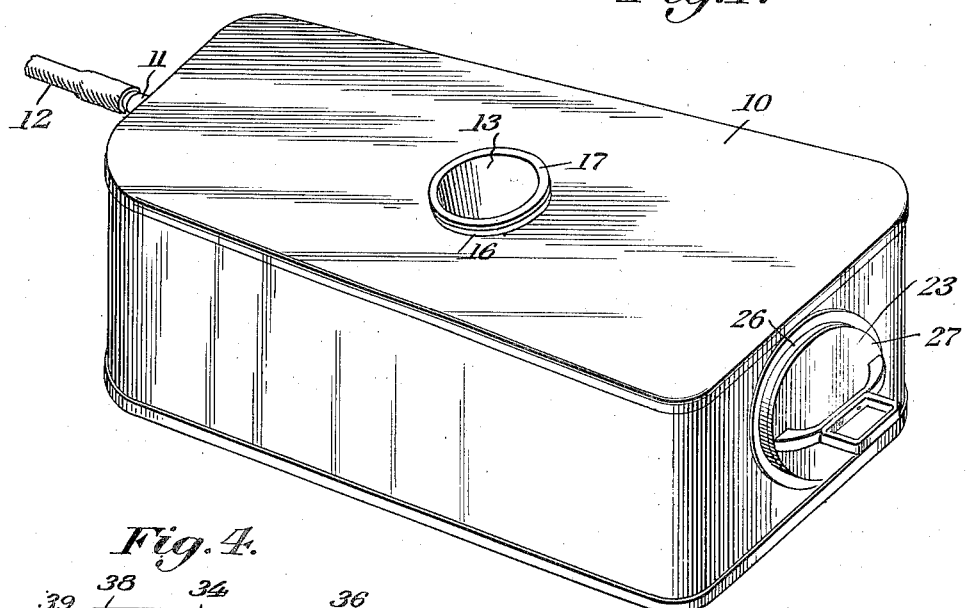
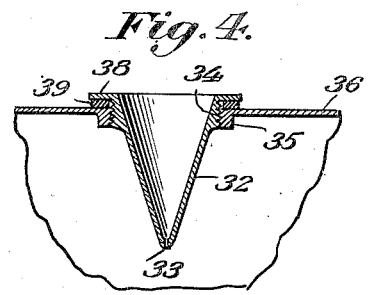
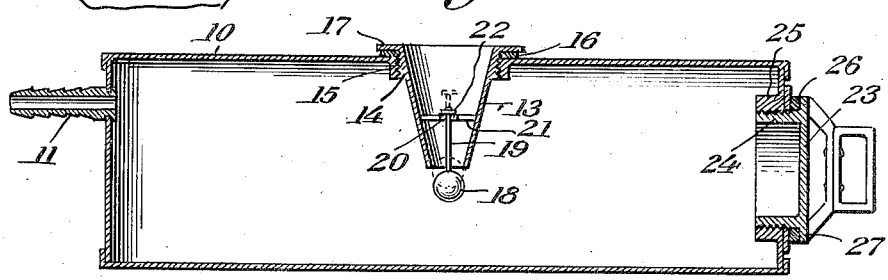
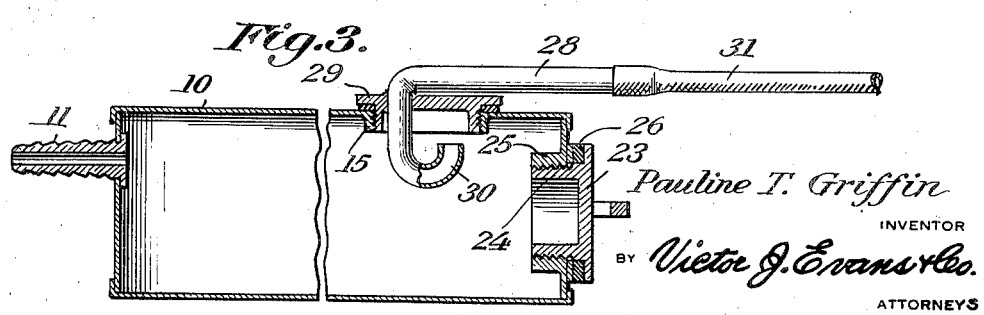
Pauline T. Griffin
INVENTOR
BY Victor J. Evans & Co.
ATTORNEYS Patented Aug. 9, 1938

REISSUED
DEC 3 1940

2,126,631

UNITED STATES PATENT OFFICE 2,126,631

DRAIN PAN

Pauline T. Griffin, Greenville, N. C.

Application January 11, 1937, Serial No. 120,100

1 Claim. (Cl. 128—275)

This invention relates to drain pans or bed pans and has for an object to provide a device of this character which will be particularly adapted for use in hospitals in relieving gas pains after an operation, and at the same time catch and retain any leakage or secretions that might drain from the patient.

A further object is to provide a device of this character that will be completely enclosed and will be so constructed as to prevent leakage should the device be turned over or upset.

A further object is to provide a device of this character which may be readily kept clean and sanitary and which will be formed of a few strong simple and durable parts, which will be inexpensive to manufacture, and which will not easily get out of order.

With the above and other objects in view the invention consists of certain novel details of construction and combinations of parts hereinafter fully described and claimed, it being understood that various modifications may be resorted to within the scope of the appended claim without departing from the spirit or sacrificing any of the advantages of the invention.

In the accompanying drawing forming part of this specification—

Figure 1 is a perspective view of a drain pan or bed pan constructed in accordance with the invention.

Figure 2 is a longitudinal sectional view of the pan shown in Figure 1.

Figure 3 is a longitudinal sectional view of a modified form of the invention showing the pan equipped with an overflow pipe which may be substituted for the valve controlled funnel ordinarily in use in connection with the pan.

Figure 4 is a detail longitudinal sectional view of a modified form of the invention.

Referring now to the drawing in which like characters of reference designate similar parts in the various views, 10 designates a substantially flat completely enclosed pan which may be formed of any suitable material and preferably is provided with a bottom of thicker gauge material than the walls and the top of the pan so that the pan will not easily be overturned when positioned in the bed between the sheets or held between the patient's legs.

A hose connection 11 is secured in one end wall of the pan to receive a rubber hose 12 which may be inserted in a wound to drain the wound or may be inserted in the rectum to relieve gas pains after an operation and this latter use will perhaps be the most frequent use to be made of the pan in hospitals and other places. The hose 12 may be of any length and may even be of such length that the pan may be set upon the floor adjacent to the bed in lieu of being placed upon the bed itself.

A funnel 13 is provided with a threaded boss 14 which has screw threaded engagement with an internally threaded ring 15 integral with the top of the pan. A gasket 16 is interposed between the top of the pan and a flange 17 on the funnel to form a liquid tight connection with the pan.

A ball valve 18 controls the opening at the bottom of the funnel. The valve is provided with a stem 19 which is slidably fitted in a ring bearing 20 having radially disposed arms 21 that are terminally secured to the inner surface of the funnel. The stem terminates in a disc 22 which engages the bearing 20 and limits opening movement of the valve. The valve is normally open so that gas from a patient may escape through the funnel without obstruction. Should the pan overturn, however, the ball valve will automatically close and seal the funnel so that none of the liquid contents of the pan which may drain from the patient simultaneously with the expulsion of the gas, can escape and soil adjacent articles.

A plug 23 is provided with an exteriorly threaded flange 24 which screw threadedly engages an interiorly screw threaded ring 25 forming an outlet opening in the end wall of the pan opposite the hose connection 11. A gasket 26 is compressed against the end of the pan by a flange 27 on the plug to maintain a liquid tight joint when the plug is screwed in. Removal of the plug permits the pan to be cleansed by connecting a water hose to the connection 11 and directing a stream of water through the pan and through the outlet opening defined by the ring 25.

In lieu of the funnel 13 the pan may be equipped with an overflow connection the same comprising a pipe 28 which extends downwardly through a flanged cap 29 which is screwed into the interiorly threaded funnel securing ring 15 in lieu of the funnel. The lower end of the pipe is curved back upon itself toward the cap as shown at 30 so that when the pan becomes full the overflow will escape through the pipe 28 and through a hose 31 connected thereto to any suitable catch basin. The construction of the pan and the hose connection and the plug closure of the outlet opening, in Figure 3, are identical with the similar parts illustrated, in Figure 2, so that the same reference numerals have been applied.

In the modified form of the invention shown in Figure 4 the check valve is dispensed with and the funnel 32 is substantially conical. A gas escape opening 33 of small diameter is provided in the tip of the funnel. As heretofore described the funnel is provided with a threaded boss 34 which has screw threaded engagement with an internally threaded ring 35 formed integral with the top of the plate 36. A gasket 39 is interposed between the top of the pan and a flange 38 on the funnel to form a liquid tight connection between the funnel and the pan.

Since the operation of the device has been described as the description of the parts progressed it is thought that the construction and operation of the invention will be fully understood without further explanation.

What is claimed is:

A drain pan comprising a substantially flat completely enclosed pan formed with a bottom of thicker gauge material than the walls and the top of the pan so as not to be easily overturned, a hose connection secured in one end wall of the pan, a funnel provided with an externally threaded boss, an internally threaded ring integral with the top of the pan, said boss being screw threadedly engaged with said ring, a flange formed on the top of the funnel, a gasket interposed between the top of the pan and the flange to form a liquid-tight connection with the pan, a ring bearing in the funnel having radially disposed arms terminally secured to the inner surface of the funnel, the bottom of the funnel being disposed approximately at the center of the pan and having an opening of small diameter therein, a ball valve in said opening, a stem for the valve slidably fitted in said bearing, and a disc on said stem engageable with said bearing to limit opening movement of the valve.

PAULINE T. GRIFFIN.